(12) United States Patent
Haas

(10) Patent No.: US 6,341,743 B1
(45) Date of Patent: Jan. 29, 2002

(54) STRING LINE ROLLER

(76) Inventor: Charles R. Haas, Brite Stripe Co., 1111 Hopewell Rd., Downingtown, PA (US) 19335

( * ) Notice: Subject to any disclaimer, the term of this patent is extended or adjusted under 35 U.S.C. 154(b) by 0 days.

(21) Appl. No.: 09/524,785

(22) Filed: Mar. 13, 2000

Related U.S. Application Data

(60) Provisional application No. 60/130,329, filed on Apr. 21, 1999.

(51) Int. Cl.$^7$ .............................................. B65H 75/40
(52) U.S. Cl. .................................... 242/391; 242/405.3
(58) Field of Search ............................. 242/391, 405.3, 242/588.2; 15/230.11, 244.2; D4/122, 199

(56) References Cited

U.S. PATENT DOCUMENTS

| | | | |
|---|---|---|---|
| 222,854 A | | 12/1879 | Avery |
| 280,628 A | * | 7/1883 | Johnson ...................... 242/391 |
| 320,555 A | | 6/1885 | Haslam |
| 508,426 A | | 11/1893 | Klipstein |
| 511,232 A | | 12/1893 | Braze |
| 902,801 A | * | 11/1908 | Bergland .................... 242/391 |
| 2,284,077 A | * | 5/1942 | Wallace .................. 242/405.3 |
| 2,610,003 A | | 9/1952 | Bond et al. |
| 3,078,059 A | * | 2/1963 | Johnson et al. ............. 242/391 |
| 3,680,807 A | * | 8/1972 | Fortson ...................... 242/391 |
| 3,731,887 A | * | 5/1973 | Wheeler ................... 242/405.3 |
| 3,745,624 A | * | 7/1973 | Newman ................... 29/116 R |
| 3,751,748 A | * | 8/1973 | Roe et al. ................. 15/203.11 |
| 3,906,581 A | * | 9/1975 | Marino et al. ........... 15/230.11 |
| 4,056,241 A | * | 11/1977 | Yates ......................... 242/391 |
| 4,111,387 A | * | 9/1978 | Leary ...................... 242/405.3 |
| 4,263,690 A | * | 4/1981 | Dobosi .................... 15/230.11 |
| 4,742,597 A | * | 5/1988 | LaFlamme ................. 15/244.2 |
| 5,188,307 A | * | 2/1993 | Miller ..................... 242/405.3 |
| 5,868,334 A | * | 2/1999 | Cedillo .................... 242/405.3 |
| 5,957,400 A | * | 9/1999 | Brannen ..................... 242/391 |
| D423,789 S | * | 5/2000 | Saji .............................. D4/122 |

FOREIGN PATENT DOCUMENTS

| | | | | |
|---|---|---|---|---|
| CA | 945534 | * | 4/1974 | ................. 242/391 |
| CH | 359293 | | 2/1962 | |
| GB | 901606 | | 7/1962 | |
| GB | 1280107 | * | 7/1972 | ................. 242/391 |

* cited by examiner

Primary Examiner—Emmanuel M. Marcelo
(74) Attorney, Agent, or Firm—Richard C. Litman

(57) ABSTRACT

A roller having a pair of solid rubber tires at each end is disclosed. The roller is rotatably supported on a spindle which is attached to one end of a crank shaped rod. The other end of the crank shaped rod terminates in a handle or grip. The butt end of the grip has a threaded hole for receiving a threaded extension projecting from an elongated handle resembling a staff. A quantity of string is wound around the roller for use as a guide line for marking pavement, excavating, and other construction related activities.

3 Claims, 4 Drawing Sheets

STRING LINE ROLLER

CROSS-REFERENCE TO RELATED APPLICATION

This application claims the benefit of U.S. Provisional Patent Application Serial No. 60/130,329, filed Apr. 21, 1999.

BACKGROUND OF THE INVENTION

1. Field of the Invention

The present invention relates to a roller which acts as a reel or spool for string which is used as a guide line for marking pavement, excavating, and other construction related activities.

2. Description of Related Art

In the construction field it is often necessary to provide a taut string or line to be used, for example, as a guide in marking pavement or as a guide when performing an excavating operation. Such lines are generally anchored at one end using heavy weights, stakes driven into the ground, or batter boards. It is not uncommon for such lines to be stretched out over hundreds of feet. Gathering up such a long length of line each time the guide line setup has to be moved from one location to the next, is time consuming and inconvenient. Sometimes, it may be possible for two workers to move a string by having each worker move a respective end of the string, however, this maneuver is rarely possible because oftentimes there are too many obstacles at the site thatwould prevent such a maneuver. Therefore, it would be highly desirable to have a means for quickly gathering up a guide string and for quickly paying out the guide string once the guide string has been moved. Such a device would also have the added benefit of allowing a single worker to quickly and conveniently move a guide string without requiring the assistance of a second worker, thus freeing up valuable laborer time.

Devices that are designed to reel in or unreel string, rope, hose and the like are known. Examples of such devices apper in the reference cited below.

U.S. Pat. No. 222,854, issued to Robert H. Avery on Dec. 23, 1879, shows a reel for laying out a cord for use as a guide in planting corn. U.S. Pat. No. 320,555, issued to Henry F. Haslam on Jun. 23, 1885, shows a reel with a crank handle for reeling in a chalk line. U.S. Pat. No. 508,426, issued to Friedrich C. Klipstein on Nov. 14, 1893, shows a carriage having a reel for carrying wire. The reel in Klipstein is turned by a chain and sprocket arrangement driven by the axle of the carriage wheels. U.S. Pat. No. 511,232, issued to Joseph E. Brazee on Dec. 19, 1893, shows a reel for wire which also acts to stretch the wire. The reel in Brazee is supported by a frame and the reel is configured to turn in only one direction using a ratchet and pawl arrangement. U.S. Pat. No. 2,610,003, issued to Robert D. Bond et al. on Sep. 9, 1952, shows a hose reel with a combined handle and support frame. The reel in Bond et al. has a spoked wheel at either end thereof.

Swiss Patent-Related Document Number 359293, by Henri Schmid et al., dated Feb. 15, 1962, shows a reel for reeling in a plumb bob. United Kingdom Patent Specification Number 901,606, by Archibald Donald Davidson, dated Jul. 18, 1962, shows a reel for hose or electric cable that can be easily dismantled.

None of the above inventions and patents, taken either singly or in combination, is seen to describe the instant invention as claimed. In particular, none of the above references is seen to teach or suggest a reel particularly suited for reeling in string by using contact with the ground to turn the reel and with very little additional effort being required apart from walking toward the anchored end of the string.

SUMMARY OF THE INVENTION

The present invention is directed to a roller which acts as a reel or spool for string which is used as a guide line for marking pavement, excavating, and other construction related activities. The roller has a pair of solid rubber tires at each end thereof. The roller is rotatably supported on a spindle which is attached to one end of a crank shaped rod. The other end of the crank shaped rod terminates in a handle or grip. The butt end of the grip has a threaded hole for receiving a threaded extension projecting from an elongated handle resembling a staff. A quantity of string is wound around the roller for use as a guide line for marking pavement, excavating, and other construction related activities.

Accordingly, it is a principal object of the invention to provide a device for convenient unreeling and taking up of line used as a guide in construction related activities.

It is another object of the invention to provide a roller for taking up of line, used as a guide in construction related activities, as the user walks toward a point at which the end of the string is anchored.

It is a further object of the invention to provide a roller for taking up of line, which is set in rotational motion by contact with the ground.

Still another object of the invention is to provide a roller supported by an elongated handle such that the roller can be caused to rotate due to contact with the ground without the user having to bend.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
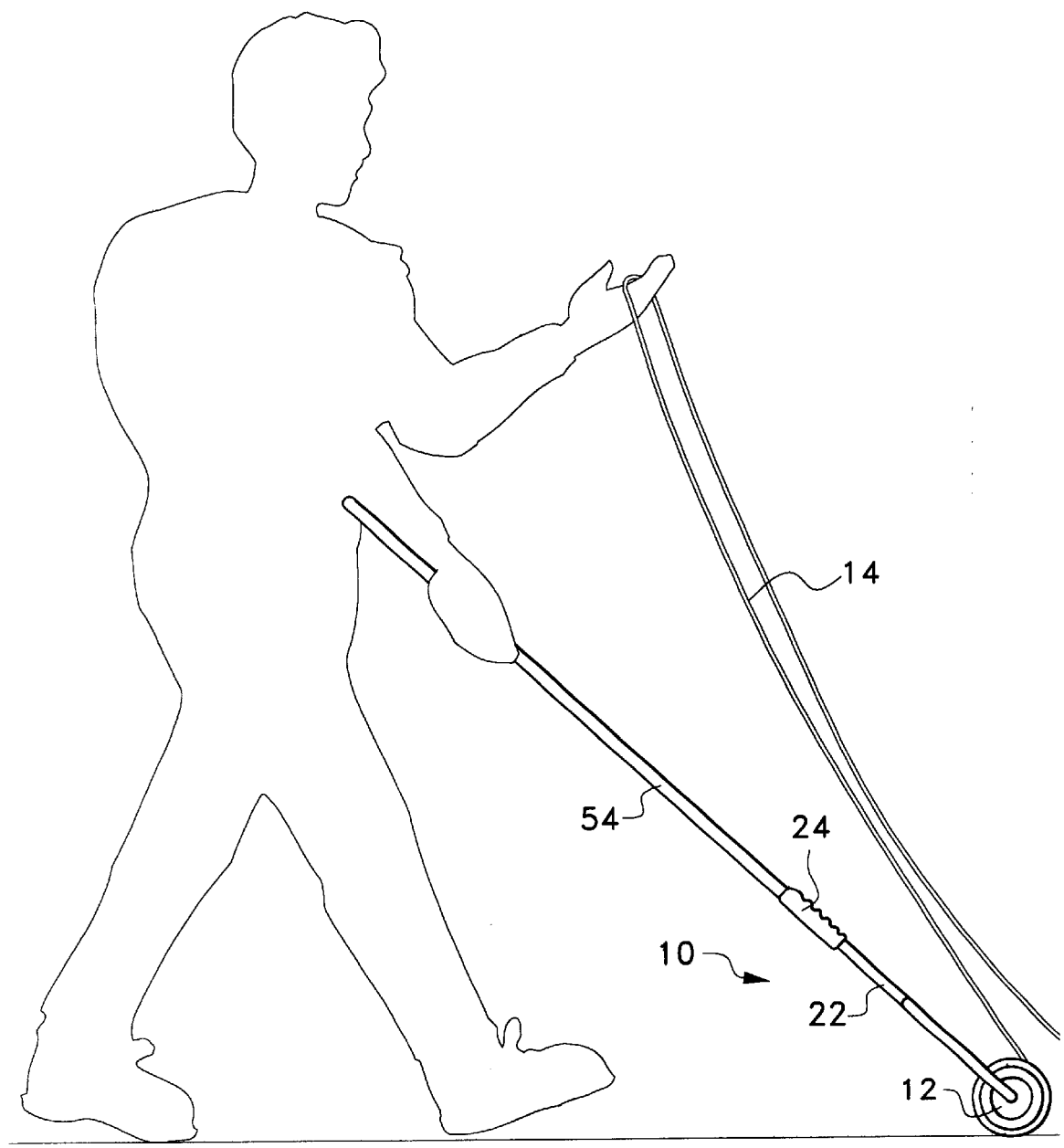
FIG. 1 is an environmental view of a string line roller according to the present invention being employed by a user to take up line.
Figure 2:
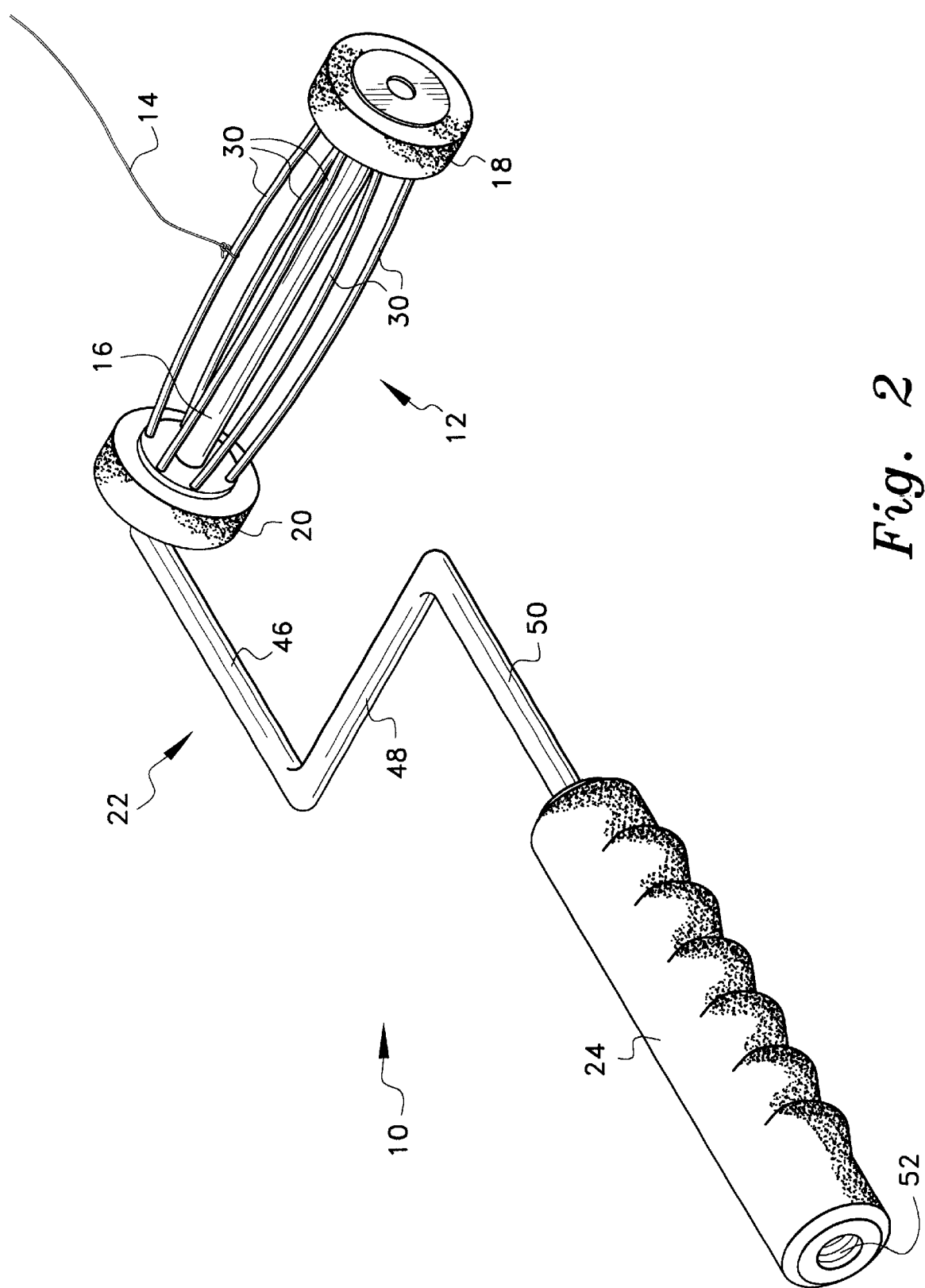
FIG. 2 is a perspective view of a string line roller according to the present invention, showing the attachment of the string to the roller.

Referring to FIGS. 1–4, the present invention is directed to a string roller 10 for paying out, and taking up string under the control of a user. The string roller 10 includes a roller 12 which acts as a reel or spool for the string 14 which is stretched out to serve as a guide line for marking pavement, laying out a chalk line, excavating, and other construction related activities. In addition to the roller 12, the string roller 10 includes a shaft 16, a pair of solid rubber tires 18 and 20, a cranked rod 22, and a hand grip 24.

The shaft 16 has a first end and a second end. The roller 12 is rotatably supported on the shaft 16. The roller 12 also has a first end and a second end. A first rubber tire 18 is supported about the first end of the roller 12, and the second rubber tire 20 is supported about the second end of the roller 12.

The roller 12 is constructed using at least a first hub 26, a second hub 28, and a plurality of rods 30. The first hub 26 is rotatably supported about the shaft 16 near the first end of the shaft 16. The first hub 26 has a first annular rim 32 projecting radially outward from the first hub 26. In other words, the first annular rim 32 projects outward from the first hub 26 in a direction which is perpendicular to the longitudinal axis of the shaft 16. The second hub 28 is rotatably supported about the shaft 16 near the second end of the shaft 16. The second hub 28 has a second annular rim 34 projecting radially outward from the second hub 28. Similar to the first annular rim 32, the second annular rim 34 projects outward in a direction which is perpendicular to the longitudinal axis of the shaft 16, but in this case the rim 34 projects outward from the second hub 28. The plurality of bowed rods 30 extend between the first hub 26 and the second hub 28.

Figure 3:
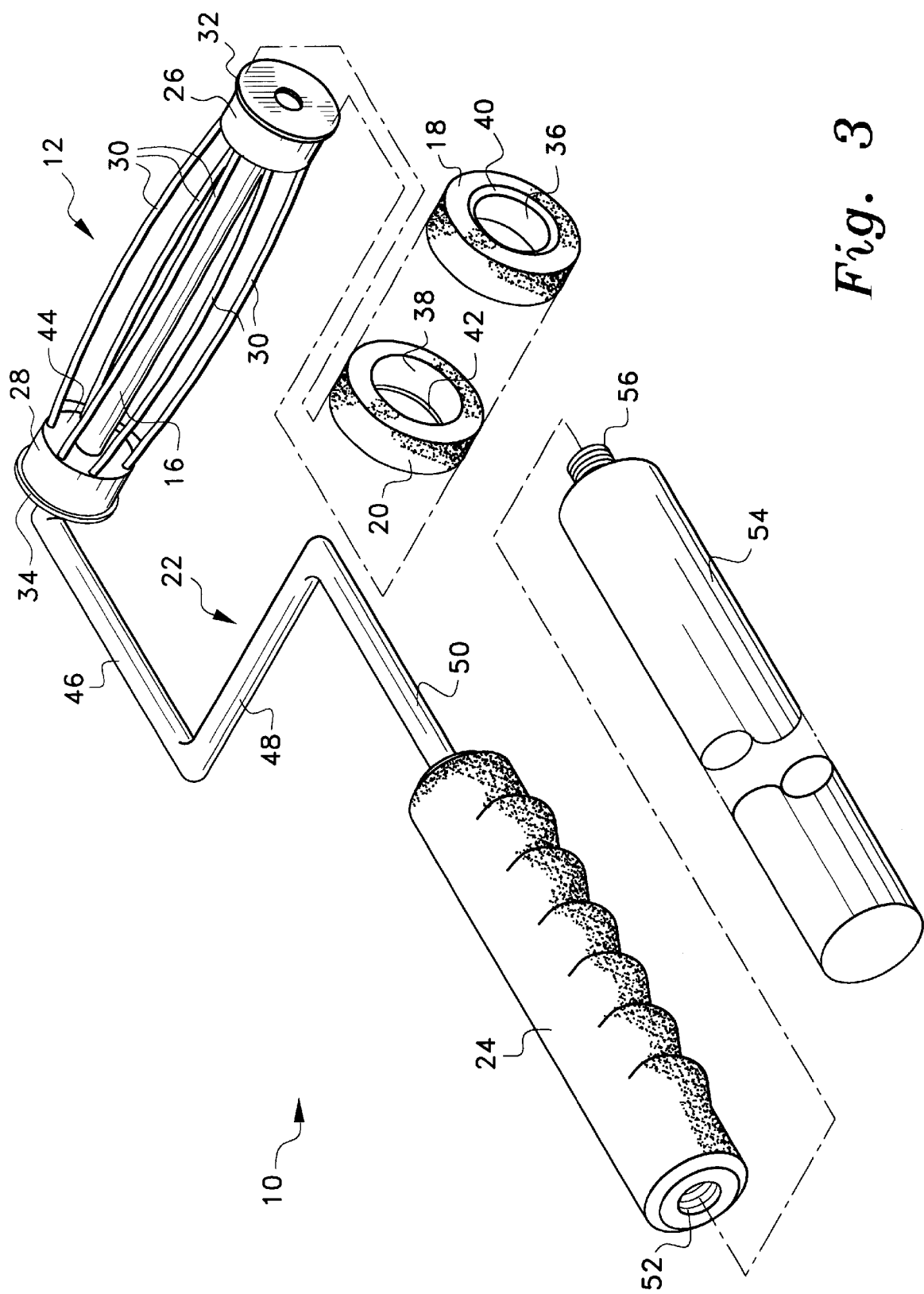
FIG. 3 is an exploded view of a string line roller according to the present invention.
Figure 4:
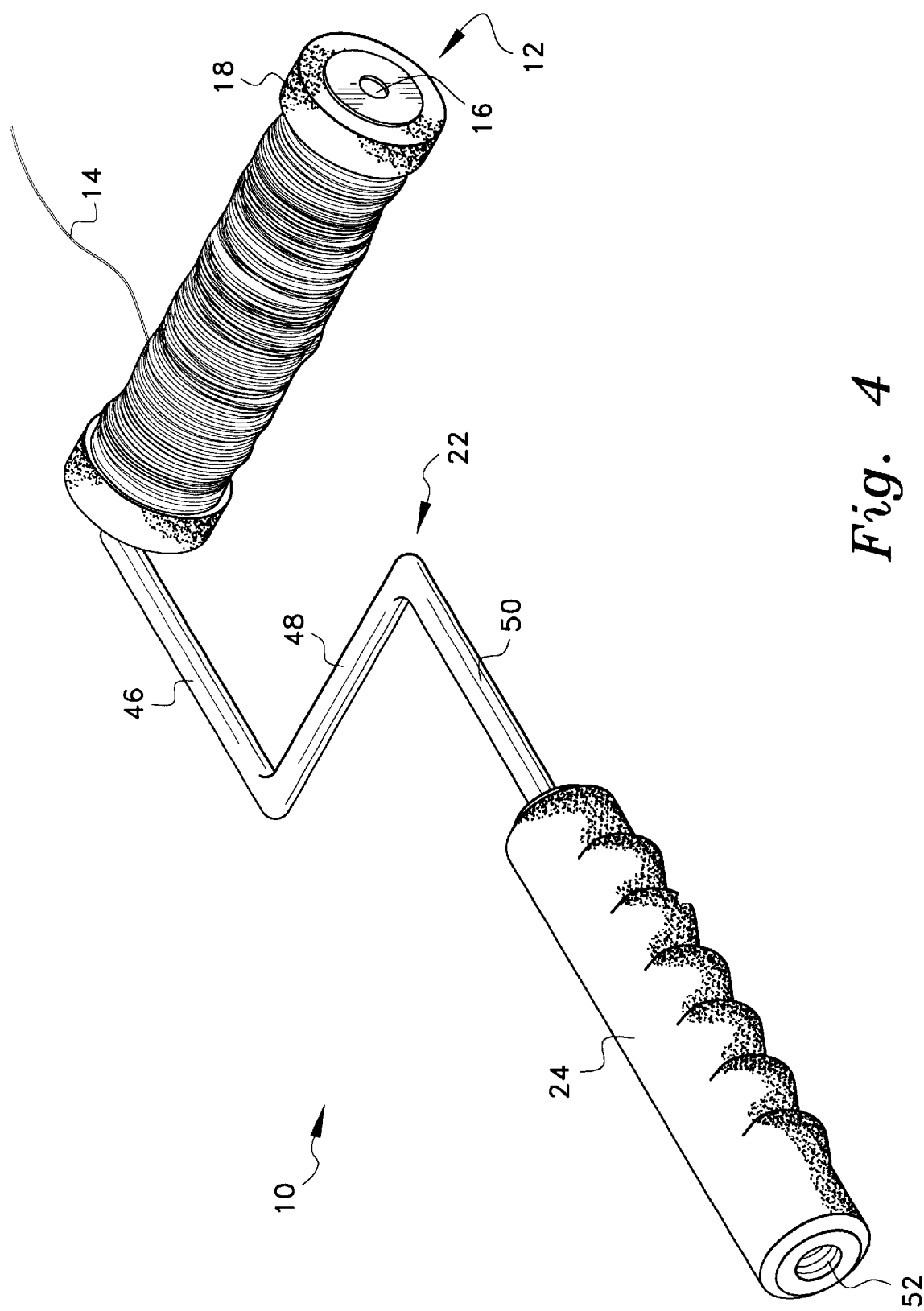
FIG. 4 is a perspective view of a string line roller according to the present invention, showing a quantity of string wound around the roller.

The hubs 26 and 28 are roughly cylindrical and have a central passage which surrounds the shaft 16 once the hubs 26 and 28 are mounted to the shaft 16. With the hubs 26 and 28 mounted to the shaft 16, the inner annular surfaces 44 (only one shown, the other being a mirror image) of the hubs 26 and 28 will face each other as shown in FIG. 3. Each surface 44 has a plurality of cavities which are equal in number to the rods 30. Each of the plurality of cavities in the surfaces 44 is dimensioned and configured to receive an end of a respective one of the rods 30.

Each of the rubber tires 18 and 20 has a central opening, numbered 36 and 38 respectively. On one side of each tire 18 and there is an annular countersunk region or recess, numbered 40 and 42 respectively, which surrounds a respective one of the central openings 36 and 38 of the tires 18 and 20. The first annular rim 32 fits into the first annular recess 40 and the second annular rim 34 fits into the second annular recess 42, when the tires 18 and 20 are engaged to the hubs 26 and 28 respectively. The annular rims 32 and 34 prevent the tires 18 and 20 from slipping off their respective hubs 26 and 28.

The roller 12 can be retained on the shaft 16 in any well known manner which does not interfere with the free rotation of the roller 12. For example, the roller 12 may be held in place by a cotter pin engaging a hole in the shaft 16, a retaining ring engaging a groove in the shaft 16, a nut engaging threads provided at the end of the shaft 16, or a disc held at the end of the shaft 16 by a screw engaging a threaded hole formed in the first end of the shaft 16 and extending into the shaft 16 coaxially with the shaft 16. In addition, the roller 12 may include a tubular sleeve which surrounds the shaft 16 and extends between the hubs 26 and 28. This tubular sleeve would also pass through the central passages of the hubs 26 and 28, and the hubs 26 and 28 would be fixed to this tubular sleeve. The ends of this tubular sleeve could be flared or flanged to retain the hubs 26 and 28 on this tubular sleeve.

The cranked rod 22 has a first portion 46, a crank arm 48, and a tail portion 50. The first portion 46, the crank arm 48, and the tail portion 50 are parts of one continuous rod. The terminus of the first portion 46 which is attached to the shaft 16, defines the first end of the cranked rod 22. The first end of the cranked rod 22 is attached to the second end of the shaft 16. The crank arm 48 extends parallel to the shaft 16. The first end of the crank arm 48 is attached to the first portion 46 of the cranked rod 22, such that the first portion 46 extends perpendicularly between the first end of the crank arm 48 and the second end of the shaft 16. The tail portion 50 of the cranked rod 22 extends perpendicularly from the second end of the crank arm 48 such that the tail portion 50 of the cranked rod 22 extends along a line that perpendicularly bisects the shaft 16.

The hand grip 24 is supported on the tail portion 50 of the cranked rod 22. The hand grip 24 is oriented such that its longitudinal axis is roughly coincident with a line that perpendicularly bisects the shaft 16. The hand grip 24 has a butt end which has a threaded hole 52. The string roller 10 further includes an elongated handle 54 which has a threaded projection 56. The threaded projection 56 is engageable to the threaded hole 52 in the butt end of the hand grip 24.

In use, the end of a quantity of string 14 is tied to one of the rods 30 and then the quantity of string is wound around the roller 12 in a manner that will be described later. The roller 12 can for example be designed to hold roughly 500 feet of string which should be enough for most applications. To lay out a guide line, the free end of the string 14 is tied to a stake, batter board, weight, etc., and then the user walks away from the anchor point of the string in the direction in which the user wishes the guide line to extend. The string 14 is paid out from the roller 12 as the user walks away from the location at which the string is anchored while carrying the string roller 10. Once the user walks off the desired distance, then the user will stretch the string tight and the user will anchor the portion of the string 14 located near the roller 12 by, for example, wrapping the string around a concrete block.

Once the operation for which the guide string was needed is completed, the string 14 is once again wound around the roller 12 as the user walks toward the location at which the free end of the string 14 is anchored. While walking toward the anchor point, the user keeps the rubber tires 18 and 20 in contact with the ground such that the roller 12 turns and takes up string as the user walks closer to the anchor point of the string. The user holds the elongated handle 54 with one hand and he or she guides the string from side to side with the other hand as the roller 12 is turning. Guiding the string with the free hand in the manner just described ensures that the quantity of string is evenly distributed along the length of the roller 12 as the string is wound around the roller 12. The diameter of the wheels 18 and 20 must be large enough so that the ground will not interfere with the winding of the string around the roller 12. Once the user reaches the anchor point of the string, the string will have been almost completely wound around the roller 12.

It is to be understood that the present invention is not limited to the sole embodiment described above, but encompasses any and all embodiments within the scope of the following claims.

I claim:

1. A string roller for paying out and taking up string under the control of a user, the string roller comprising, in combination with a quantity of string:

a shaft having a first end and a second end;

a roller rotatably supported on said shaft, said roller having a first end and a second end;

a pair of rubber tires, a first one of said pair of rubber tires supported about said first end of said roller, and a second one of said pair of rubber tires supported about said second end of said roller, each of said pair of rubber tires having a central opening;

said roller further including:
- a first hub rotatably supported about said shaft proximate said first end of said shaft, said first hub having a first annular rim projecting radially outward from said first hub, said first annular rim fitting into a first annular recess surrounding said central opening of said first one of said pair of rubber tires;
- a second hub rotatably supported about said shaft proximate said second end of said shaft, said second hub having a second annular rim projecting radially outward from said second hub, said second annular rim fitting into a second annular recess surrounding said central opening of said second one of said pair of rubber tires; and
- a plurality of bowed rods extending between said first hub and said second hub;

a cranked rod having a first end and a tail portion, said first end of said cranked rod being attached to said second end of said shaft; and a hand grip supported on said tail portion of said cranked rod, whereby when the quantity of string is wound around said roller and a free end of the string is anchored at a location selected by the user, string can be paid out from said roller as the user walks over a surface in a direction away from the location at which the string is anchored while carrying the string roller, and the string can be wound around said roller as the user walks toward the location at which the string is anchored with said pair of rubber tires in contact with the surface upon which the user is walking.

2. The string roller according to claim 1, wherein said cranked rod has a crank arm extending parallel to said shaft said crank arm having a first end and a second end, said cranked rod further having a first portion extending between said first end of said crank arm and said second end of said shaft, said tail portion of said cranked rod extending perpendicularly from said second end of said crank arm such that said hand grip extends along a line that perpendicularly bisects said shaft.

3. The string roller according to claim 2, wherein said hand grip has a butt end and a threaded hole in said butt end, the string roller further including an elongated handle, said elongated handle having a threaded projection which is engageable to said threaded hole in said butt end of said hand grip.

* * * * *